United States Patent [11] 3,607,950

[72] Inventors Rolf Platz
 Mannheim;
 Franz Merger, Ludwigshafen am Rhine, both of Germany
[21] Appl. No. 728,842
[22] Filed May 13, 1968
[45] Patented Sept. 21, 1971
[73] Assignee Badische Anilin- & Soda-Fabrik Aktiengesellschaft
 Ludwigshafen am Rhine, Germany
[32] Priority May 13, 1967
[33] Germany
[31] P 12 92 661.3

[54] PRODUCTION OF 2,6-DIMETHYL-3,4-DIHALOPHENOLS
 4 Claims, No Drawings
[52] U.S. Cl. .................................................. 260/623
[51] Int. Cl. .................................................. C07c 39/26
[50] Field of Search .......................................... 260/623 H, 650 R

[56] References Cited
 UNITED STATES PATENTS
 2,350,677 6/1944 Gladden ........................ 260/623
 OTHER REFERENCES
 Gleed et al., " J. Chem. Soc." London (1948) 209– 211 (Q-Di.C6)
 Kammerer et al., " Berichte," 96:2613– 2616 (1963) (QD1.D4)
 Foreman et al., " J. Amer. Chem. Soc.," 76:4977– 4979 (1954)

Primary Examiner—Bernard Helfin
Assistant Examiner—W. B. Lone
Attorney—Marzall, Johnston, Cook & Root ABSTRACT: The production of 2,6-dimethyl-3,4-dihalophenols by reaction of 2,6-dimethyl-4-tertiary-butylphenol with sulfuryl halides. The new products of the process are valuable starting materials for the production of fungicides and bactericides.

PRODUCTION OF 2,6-DIMETHYL-3,4-DIHALOPHENOLS

This invention relates to the production of 2,6-dimethyl-3,4-dihalophenols by the reaction of 2,6-dimethyl-4-tertiary-butylphenol with sulfuryl halides.

It is known from Angewandte Chemie, volume 46 (1933), pages 296 and 297, and volume 52, pages 263 and 264, that 2,6-dimethyl-4-chlorophenol can be obtained by reaction of 2,6-dimethylphenol with sulfuryl chloride. A paper in the Journal of the Chemical Society, 1948, pages 209 to 211, describes the production of 5-chloro-4-bromo-m-2-xylenol by bromination of 5-chloro-m-2-xylenol. Both methods start from difficulty accessible materials and 2,6-dimethyl-phenol is almost invariably contaminated with the 2,4-isomer. A method for the production of 2-chloro-4-tertiary-butylphenol by reaction of 4-tertiary-butylphenol with sulfuryl chloride is described in Chemische Berichte, volume 96 (1963), pages 2613 et seq.; up to 15% of 4-chlorophenol is obtained as a byproduct.

The object of this invention is to provide a new process for the production of 2,6-dimethyl-3,4-dihalophenols in a simple manner, in pure form and with good yields starting from readily accessible materials.

This and other objects of the invention are achieved and 2,6-dimethyl-3,4-dihalophenols are obtained advantageously by reacting 2,6-dimethyl-4-tertiary-butylphenol with sulfuryl halides.

When sulfuryl chloride is used, the reaction may be represented by the following formulas

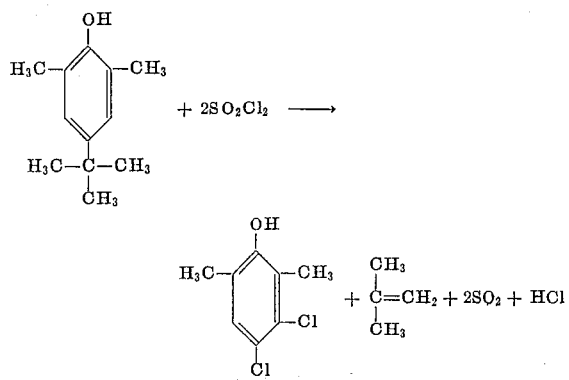

Starting from easily accessible materials, the process according to the invention gives 2,6-dimethyl-3,4-dihalophenols in a simple manner, in pure form and in good yields. Having regard to the state of the art, it is surprising that by the above-mentioned chlorination the tertiary-butyl group should be replaced by chlorine and at the same time the phenol nucleus should be substituted in the 3-position by chlorine without formation of appreciable amounts of other chlorination products.

2,6-dimethyl-4-tertiary-butylphenol and a sulfuryl halide, preferably the chloride, are used as the starting materials. The sulfuryl halides are used in the stoichiometric amount or in excess, preferably in an excess of up to 0.25 times the stoichiometric amount.

The reaction is carried out at a temperature of from $-10°$ to $+50°$ C., preferably from $0°$ to $50°$ C., the starting materials being reacted with each other at atmospheric or superatmospheric pressure, continuously or batchwise. In general the reaction is carried out in the presence of organic solvents which are inert under the reaction conditions, such as aliphatic carboxylic acids, for example glacial acetic acid, or chlorohydrocarbons, for example carbon tetrachloride.

The reaction may be carried out as follows: a sulfuryl halide, with or without a solvent, is gradually added at the above-mentioned temperature with good stirring to 2,6-dimethyl-4-tertiary-butylphenol with or without solvent. The mixture is left for a few hours at the said temperature; the gases (isobutylene and sulfur dioxide) with escape can be reused. The end product is then separated from the reaction mixture by conventional methods, for example by fractional distillation and recrystallization, for example from ligroin.

The compounds which can be prepared according to the process of the invention are valuable starting materials for the production of fungicides and bactericides. For example 2,6-dimethyl-3,4 -dichlorophenol shows a good action in the Aspergillus Test down to concentrations of 5 p.p.m. and may be used in organic solvents or in aqueous solution in the form of the sodium salt as a wood preservative with a defined chlorine content (see H. Müller and H. Linde, Chemische Technik 1956, Part 7, pages 382 to 386).

The invention is illustrated in the following examples in which the parts specified are parts by weight.

EXAMPLE 1

320 parts of sulfuryl chloride in 200 parts of glacial acetic acid is added gradually in the course of two hours while stirring at 10° to 20° C. to a solution of 200 parts of 2,6-dimethyl-4-tertiary-butylphenol in 250 parts of glacial acetic acid in a stirred vessel (cooling with ice water). Isobutylene and sulfur dioxide escaping from the reddening solution are collected through a reflux condenser in two cooled receivers downstream thereof.

The reaction mixture is allowed to stand for some hours at 25° to 30° C. and then subjected to fractional distillation under subatmospheric pressure. After excess sulfuryl chloride and the solvent have been separated, 183 parts of 2,6-dimethyl-3,4-dichlorophenol having a boiling point of 131° to 133° C. at 3 mm. Hg is obtained. The crude crystalline product, which at first is red brown in color, is purified by redistillation or by recrystallization, for example from ligroin. 175 parts (equivalent to 81.6% of the theory) of end product is obtained having a melting point of 81° to 83° C.

Analysis:
calculated: C 50.29% H 4.22% O 8.37% cl. 37.12%
found: C 50.3% H 4.1% O 8.9% cl. 36.9%.

EXAMPLE 2

200 parts of 2,6-dimethyl-4-tertiary-butylphenol is dissolved in 250 parts of glacial acetic acid as described in example 1 and reacted in the course of 2 hours at 5° to 15° C. with 290 parts of sulfuryl chloride in 200 parts of glacial acetic acid. 17.2 parts of 2,6-dimethyl-4-chlorophenol having a boiling point of 100° to 103° C. at 3 mm. Hg and 153 parts of 2,6-dimethyl-3,4-dichlorophenol having a boiling point of 131° to 133° C. at 3 mm. Hg (equivalent to 71.5% of the theory) are obtained by fractional distillation.

We claim:

1. A process for the production of 2,6-dimethyl-3,4-dichlorophenol which comprises reacting 2,6-dimethyl-3,4-tertiary-butylphenol with sulfuryl chloride at a temperature of from $-10°$ to $+50°$ C.

2. A process as claimed in claim 1 carried out with an amount of sulfuryl halide which is up to 0.25 times in excess of the stoichiometric amount.

3. A process as claimed in claim 1 carried out at a temperature of from 0° to 50° C.

4. A process as claimed in claim 1 carried out in the presence of a solvent which is inert under the reaction conditions.